Oct. 25, 1960  M. MASEL  2,957,652

TRIM TAB SERVOMOTOR CONTROL SYSTEM

Filed May 31, 1956

INVENTOR.
MARVIN MASEL
BY
Oscar B Brumback
ATTORNEY

United States Patent Office 2,957,652
Patented Oct. 25, 1960

2,957,652

TRIM TAB SERVOMOTOR CONTROL SYSTEM

Marvin Masel, Hackensack, N.J., assignor to The Bendix Corporation, a corporation of Delaware Filed May 31, 1956, Ser. No. 588,301

10 Claims. (Cl. 244—77)

This invention relates generally to automatic control systems for aircraft, and more particularly to an automatic control system for an aircraft having primary and secondary control systems. U.S. Patent No. 2,733,879 issued February 7, 1956 to Paul A. Noxon describes an automatic control system for an aircraft having a main control surface and a small auxiliary control surface. The command for the motor which operates the main control surface is also applied to a second motor which operates an auxiliary surface, known as the trim tab or stabilizer, so as to remove the load from the main control surface when the aircraft is not in a trim condition.

The maximum speed of operation of the second surface is normally determined by the requirements that should the human pilot disengage the automatic control system the human pilot will not be subjected to a "kick" or reaction arising from a load on the main control surface. In other words, this prevents the human pilot from having to exert an appreciable force on the control surface to prevent transit motion of the aircraft when he disengages the automatic control system. A high rate of stabilizer or trim tab actuation is particularly required at low airspeed. On the other hand, I have found that excessive speed or operation of the trim tab or stabilizer reduces the stability of the aircraft under automatic control when the aircraft is operated at high speeds. For example, if the aircraft has been placed in a dive and then is being straightened out the continuous load on the control surface during the time the craft is recovering from the dive operates the trim tab servomotor in a direction to reduce the load on the surface. As the elevator surface is moved in a direction opposite to that when attitude control was first engaged the stabilizer or trim tab has been run in one direction to such an extent that the elevator servo can scarcely overcome the trim or stabilizer moment and an aircraft instability may occur.

An object of the present invention therefore is to provide a novel means for controlling the trim or stabilizer actuator in accordance with a parameter of flight of the craft.

The present invention contemplates an automatic control system for an aircraft having a main control surface and an auxiliary control surface wherein a first servomotor operates the main control surface, an auxiliary servomotor operates the auxiliary trim or stabilizer surface for the main control surface, and the speed of operation of the auxiliary servomotor is controlled as a function of a parameter of flight so that the speed of operation may be greater for low air speeds than for high air speeds.

The foregoing and other objects and advantages of the invention will appear more fully hereinafter from a consideration of the detailed description which follows, taken together with the accompanying drawing wherein two embodiments of the invention are illustrated by way of example. It is to be expressly understood, however, that the drawing is for illustration purposes only and is not to be construed as defining the limits of the invention.

In the single sheet of drawing wherein like parts are marked alike:

Figure 1:
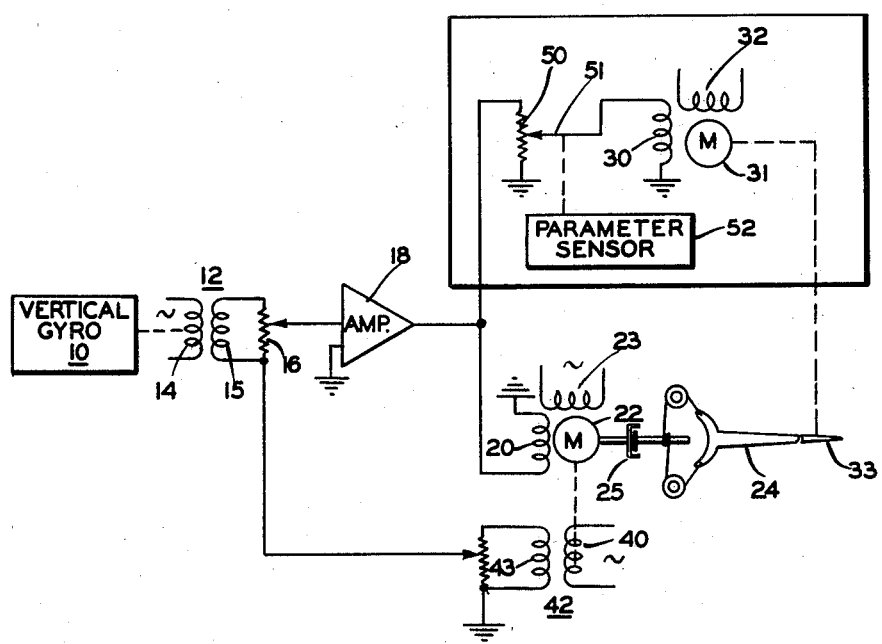
Figure 1 is a schematic illustration of the elevator channel of an automatic control system incorporating the novel auxiliary surface control arrangement of the present invention.

The elevator channel of the automatic control system in Figure 1 may be generally similar to that described in the aforementioned Patent No. 2,733,879. The attitude of the aircraft about the pitch axis is measured in a conventional manner by a vertical gyro 10 which has an inductive device 12 connected to the pitch axis trunnion so that a displacement of the craft in pitch displaces rotor 14 relative to stator 15 to develop a corresponding signal. Thus a nose heavy or tail heavy attitude of the craft due to a change in trim such as caused by change in airspeed, change in flap position, shifting cargo, or fuel consumption, develops a corresponding signal across potentiometer 16.

The signal from potentiometer 16 is applied through a conventional discriminator type amplifier 18 to energize the variable phase winding 20 of a conventional induction motor 22 whose fixed phase winding 23 is continuously energized. Motor 22 is connected with the elevator surface through a suitable clutch 25. In response to the energization of winding 20, motor 22 will deflect the main elevator surface 24 in a direction to return the craft to its correct flight attitude when clutch 25 is engaged.

The signal from amplifier 18 is also applied to the variable phase winding 30 of a conventional induction motor 31 whose fixed phase winding 32 is continuously energized. Servomotor 31 is connected through suitable gearing to drive the trim tab surface 33. Thus the trim servomotor 31 will operate at the same time as motor 22 in response to the error signal to deflect the trim tab 33 in a direction opposite to that of the elevator so as to assume a part of the loading on the elevators, thereby decreasing the torque required by the elevator servomotor.

The operation of the elevator servomotor 20 also displaces the rotor 40 of a follow-up inductive device 42 relative to stator 43 to develop a follow-up signal opposing the attitude signal from potentiometer 16. This follow-up signal tends to offset the initiating displacement signal at potentiometer 16; but, when the center of gravity, airspeed, or flap position of the craft is changed, a new angle of attack is required to maintain the craft in level flight. This new angle of attack requires a change in elevator position, thus increasing the load on elevator surface 24 thereby requiring motor 22 to exert a torque to maintain this position. The residual signal in the control circuit actuates servomotor 22 to supply this torque and at the same time actuates the trim tab motor 31. The continued operation of motor 31 positions the trim tab 33 to decrease the loading on the elevator servomotor permitting the residual signal of the system to be wiped out so that the net output of amplifier 18 is decreased to zero with the trim tab being left in a position to continuously react on the aircraft to maintain the desired attitude of flight.

As stated previously, it is desirable that the trim tab servomotor 31 should operate rapidly so as to maintain the load on the main control surface 24 at a low level so that the human pilot may disengage clutch 25 to disengage the automatic control system at any time without experiencing a "kick" from the control surface when the automatic pilot system is disengaged. The maximum rate of trim or stabilizer surface movement is necessary at low indicated error speeds where the trim or stabilizer effectiveness in terms of the hinge moment reflected on the elevator servomotor per degree of trim or stabilizer surface movement is small. At high air speeds, however, I have found that a high rate of movement of the trim or stabilizer surface tends to cause instability.

In accordance with the present invention the energization of winding 30 of motor 31 is supplied through a voltage divider 50 having a wiper 51 actuated by a parameter sensing device 52, the parameter sensor may be a conventional air speed, dynamic pressure, or Mach number sensor for moving wiper 51 downwardly as the air speed Mach number or dynamic pressure increase so as to lower the speed of operation of motor 31 at high speeds and to raise wiper 51 upwardly at lower speeds to increase the rate of operation of motor 31.

Figure 2:
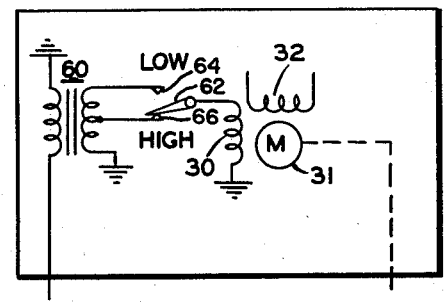
Figure 2 is another embodiment of the invention.

Figure 2 shows another embodiment of the invention wherein the signal to the trim tab motor 31 is applied by way of a coupling transformer 60 through a high or low switch 62 which may be manually or automatically controlled so as to operate the servomotor rapidly at low air speeds by closing the upper switch contact 64 and applying full electrical energy from transformer 60 across motor winding 30 and slowly at high air speeds by closing the lower switch contact 66 to apply less electrical energy from transformer 60 across motor winding 30.

The foregoing has presented a novel control system wherein the servomotor for the trim or stabilizer surface operates at a high speed for low speeds of the craft so as to maintain the force required to be exerted by the human pilot when the automatic pilot is disengaged to a low level, yet which slows the speed of operation of the auxiliary surface as the speed of the aircraft increases so as to maintain stable control of the craft by the automatic control system.

While two embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A control system for an aircraft having a primary and a secondary control surface comprising a source of signal voltage responsive to craft deviation from a desired attitude, a first servomotor operated by said signal for positioning said primary control surface to return the craft to the desired attitude, a second servomotor responsive to said signal and operated in a manner reversely of the operation of said first servomotor to position said secondary control surface so as to reduce the loading on said primary surface, means interposed between said signal source and said second servomotor for controlling the signal supplied by said source to said second servomotor, and a Mach number sensor for operating said last-mentioned control means so as to vary the rate of operation of said second servomotor with changes in the Mach number of the aircraft.

2. A control system for an aircraft having a primary control surface and a secondary control surface, comprising a source of signal voltage responsive to craft deviation from a desired attitude, a first servomotor operated by said signal for positioning said primary control surface to return the craft to the desired attitude, a second servomotor responsive to said signal and operated in a manner reversely of the operation of said first servomotor to position said secondary control surface so as to reduce the loading on said primary surface, control means to vary the rate of response of said second servomotor to said signal, and airspeed responsive means for operating said control means so as to vary said rate of response to said signal in inverse relation to the airspeed of the aircraft.

3. The novel structure of claim 2 wherein the airspeed responsive means may be a means responsive to dynamic pressure.

4. The novel structure of claim 2 wherein the airspeed responsive means includes a Mach number sensor.

5. A control system for an aircraft having a primary control surface and a secondary control surface, comprising a source of signal voltage responsive to craft deviation from a desired attitude, a first servomotor operated by said signal for positioning said primary control surface to return the craft to the desired attitude, a second servomotor responsive to said signal and operated at a variable rate in a manner reversely of the operation of said first servomotor to position said secondary control surface so as to reduce the loading on said primary surface, means interposed between said signal source and said second servomotor for controlling the signal supplied by said source to said second servomotor, and said last-mentioned control means including a movable member for changing said rate of operation of said second servomotor independently of said first servomotor.

6. The novel structure of claim 5 wherein the movable member is a switch.

7. A control system for an aircraft having an elevator and a trim tab surface comprising a source of signal voltage responsive to craft deviation from a desired pitch attitude, a second servomotor responsive to said signal positioning said elevator to return the craft to the desired attiude, a second servomotor responsive to said signal and operated in a manner reversely of the operation of said first servomotor to position said trim tab so as to reduce the loading on said primary surface, means interposed between said signal source and said second servomotor for controlling the signal supplied by said source to said second servomotor, and means operable in response to airspeed of the aircraft for operating said last-mentioned control means so as to vary the rate of operation of said second servomotor independently of said first servomotor and in inverse relation to the airspeed of the aircraft.

8. A control system for an aircraft having a primary control surface and a secondary control surface, comprising a source of signal voltage responsive to the deviation of the craft from a desired attitude, a primary servomotor operated by said signal for positioning said primary control surface to return the craft to said desired attitude, a secondary servomotor connected for operation in accordance with said signal to position said secondary control surface oppositely to the positioning of said primary control surface so as to reduce the loading on said primary surface, and means for controlling the rate of operation of said secondary servomotor including a Mach number sensor and a means interposed between said signal source and said secondary servomotor for controlling the signal supplied to said secondary servomotor as a function of the Mach number of the aircraft.

9. A control system for an aircraft having a primary control surface and a secondary control surface comprising a source of signal voltage responsive to the deviation of the craft from a desired attitude, a primary servomotor operated by said signal for positioning said primary control surface to return the craft to said desired attitude, a secondary servomotor connected for operation in accordance with said signal to position said secondary control surface oppositely to the positioning of said primary control surface so as to reduce the loading on said primary surface and means for controlling the rate of operation of said secondary servomotor including a voltage divider interposed between said signal source and said secondary servomotor and a Mach number sensor to actuate said divider to control the signal supplied to said secondary servomotor as a function of the Mach number of the aircraft.

10. A control system for an aircraft having a primary control surface and a secondary control surface comprising a source of signal voltage responsive to the deviation of the craft from a desired attitude, a primary servomotor operated by said signal for positioning said primary control surface to return the craft to said desired attitude, a secondary servomotor connected for operation in accordance with said signal to position said secondary control surface oppositely to the positioning of said primary control surface so as to reduce the loading on said primary surface, and means for controlling the rate of operation of said secondary servomotor including a means interposed between said signal source and said secondary servomotor for controlling the signal supplied to said secondary servomotor and a Mach number sensor to actuate said last named means so that the rate of the operation of said second servomotor may be controlled as the Mach number of the craft is changed.

References Cited in the file of this patent

UNITED STATES PATENTS

| | | |
|---|---|---|
| Re. 24,273 | Alderson | Feb. 12, 1957 |
| 2,723,089 | Schuck et al. | Nov. 8, 1955 |
| 2,733,879 | Noxon | Feb. 7, 1956 |
| 2,770,429 | Schuck et al. | Nov. 13, 1956 |
| 2,827,249 | Glaus | Mar. 18, 1958 |

UNITED STATES PATENT OFFICE
CERTIFICATE OF CORRECTION

Patent No. 2,957,652

October 25, 1960

Marvin Masel

It is hereby certified that error appears in the printed specification of the above numbered patent requiring correction and that the said Letters Patent should read as corrected below.

Column 4, line 24, for "a second servomotor responsive to said signal" read -- a first servomotor operated by said signal for --; line 26, for "attiude" read -- attitude --; same column 4, line 65, after "surface" insert a comma.

Signed and sealed this 25th day of April 1961.

(SEAL)
Attest:
ERNEST W. SWIDER
Attesting Officer

DAVID L. LADD
Commissioner of Patents